(12) United States Patent
Herrada

(10) Patent No.: US 11,648,915 B2
(45) Date of Patent: May 16, 2023

(54) GEAR MOTOR FOR A MOTOR VEHICLE WIPER SYSTEM

(71) Applicant: Valeo Systèmes d'Essuyage, Le Mesnil Saint Denis (FR)

(72) Inventor: Jose-Luis Herrada, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 627 days.

(21) Appl. No.: 16/617,825

(22) PCT Filed: May 23, 2018

(86) PCT No.: PCT/EP2018/063535
§ 371 (c)(1),
(2) Date: Nov. 27, 2019

(87) PCT Pub. No.: WO2018/219742
PCT Pub. Date: Dec. 6, 2018

(65) Prior Publication Data
US 2020/0108798 A1 Apr. 9, 2020

(30) Foreign Application Priority Data
Jun. 2, 2017 (FR) ...................................... 1754894

(51) Int. Cl.
*B60S 1/16* (2006.01)
*F16C 35/06* (2006.01)
(Continued)

(52) U.S. Cl.
CPC ................. *B60S 1/166* (2013.01); *B60S 1/26* (2013.01); *F16C 35/067* (2013.01); *H02K 7/081* (2013.01);
(Continued)

(58) Field of Classification Search
CPC .... H02K 5/1732; H02K 7/081; H02K 7/1166; F16H 1/16; F16H 2057/02073;
(Continued)

(56) References Cited

U.S. PATENT DOCUMENTS 5,605,071 A * 2/1997 Buchanan, Jr. ........... F16H 1/16
188/134
6,507,134 B1 * 1/2003 Severien .................. F16C 27/04
310/90
(Continued)

FOREIGN PATENT DOCUMENTS

CN 204236429 U 4/2015
CN 105556812 A 5/2016
(Continued)

OTHER PUBLICATIONS

Machine translation of CN 105556812 A obtained on Apr. 26, 2022.*
(Continued)

*Primary Examiner* — Adam D Rogers
(74) *Attorney, Agent, or Firm* — Osha Bergman Watanabe & Burton LLP

(57) ABSTRACT

The invention relates to a gear motor (1) for a motor vehicle wiper system including an electric motor (2) including a rotor (20) and a rotation shaft (22) fixed to the rotor, a reduction gear mechanism (3) including a worm/worm wheel system, a device for generating an axial load configured to offset axial play of the rotation shaft (22), including a retaining wedge (6) mounted in a sliding manner in a radial direction of said rotation shaft (22), said retaining wedge (6) exerting an axial load on the outer race of a ball bearing (5) configured to guide the rotation shaft. According to the invention, said retaining wedge (6) is arranged in an intermediate position between the seat (40) of the bearing support (4) and the worm (30) directly adjacent to the worm
(Continued)

wheel (31), said axial load (Fa) exerted by the retaining wedge (6) on the outer race (51) of the ball bearing (5) being in the direction away from the worm (30).

14 Claims, 3 Drawing Sheets

(51) Int. Cl.
    *H02K 7/08*     (2006.01)
    *B60S 1/26*     (2006.01)
    *F16C 35/067*     (2006.01)
    *H02K 7/116*     (2006.01)
    *F16H 57/021*     (2012.01)

(52) U.S. Cl.
    CPC ........ *H02K 7/1166* (2013.01); *F16C 2361/61* (2013.01); *F16C 2380/27* (2013.01); *F16H 2057/0213* (2013.01)

(58) Field of Classification Search
    CPC ..... F16H 2057/0213; F16H 2057/0221; B60S 1/166; B60S 1/26; F16C 35/067; F16C 2361/61; F16C 2380/27
    See application file for complete search history.

(56) References Cited

U.S. PATENT DOCUMENTS

| | | | |
|---|---|---|---|
| 7,077,235 B2* | 7/2006 | Eda | F16H 1/16 180/444 |
| 7,177,744 B2* | 2/2007 | Tanaka | B62D 5/0409 701/41 |
| 7,575,090 B2* | 8/2009 | Shiina | H02K 7/081 180/443 |
| 7,898,132 B2 | 3/2011 | Hong | |
| 9,281,725 B2* | 3/2016 | Scott | F16C 25/083 |
| 9,570,953 B2* | 2/2017 | Sato | H02K 5/1732 |
| 9,599,165 B2* | 3/2017 | Lu | F16C 35/077 |
| 10,432,114 B2* | 10/2019 | Herrada | H02P 6/22 |

FOREIGN PATENT DOCUMENTS

| | | |
|---|---|---|
| DE | 102018131864 A1 * | 6/2020 |
| EP | 1447305 A2 | 8/2004 |
| EP | 1050099 B1 | 11/2006 |
| EP | 2216559 A1 | 8/2010 |
| JP | 2013-203184 A | 10/2013 |
| JP | 5317751 B2 | 10/2013 |
| WO | 2010-129404 A2 | 11/2010 |

OTHER PUBLICATIONS

Machine translation of EP 2216559 A1 obtained on Apr. 26, 2022.*
International Search Report and Written Opinion in corresponding International Application No. PCT/EP2018/063535, dated Jun. 13, 2018 (13 pages).
The Office Action issued in corresponding Chinese Application No. 201880036710.6, dated Jul. 15, 2020 (7 pages).

* cited by examiner

GEAR MOTOR FOR A MOTOR VEHICLE WIPER SYSTEM

FIELD OF INVENTION

The present invention concerns a gear motor for a motor vehicle wiper system.

BACKGROUND

Gear motors essentially consist of an electric motor coupled to a reduction gear mechanism responsible for reducing the speed of the latter to obtain a high rotation transmission torque.

Various types of electric motor may be used in a gear motor and in particular brushless DC electric motors, which have numerous advantages such as long service life, small overall size, low energy consumption and low sound levels.

A gear motor of the above kind finds a particular application in a motor vehicle wiper system including one or more wiper blades and a linkage mechanism for driving the wiper blade or blades in a to-and-fro movement, said output shaft of the gear motor driving the linkage mechanism of the wiper system.

The reduction gear mechanism may be a worm/worm wheel combination, the worm being fastened to the rotation shaft of the rotor and the worm wheel being fastened to the output shaft of the gear motor.

Two or three ball bearings are typically used to guide the rotation shaft in rotation, each ball bearing including an inner race and an outer race and balls able to roll on a track of the inner race and on a track of the outer race.

Among the requirements of the specifications that manufacturers have to comply with, there is typically required an accuracy as to the angular position of the output shaft that implies elimination of axial play between the rotation shaft of the rotor and its support with the aim of locking the axial position of the worm along the axis of the rotation shaft of the rotor.

To this end, the axial position of the inner race of the ball bearing is first locked on the rotation shaft (in both directions), after which the axial position of the outer race of said bearing is locked relative to the fixed support, namely the casing of the gear motor.

There are known from the prior art in the patent literature devices for generating an axial force configured to compensate the axial play of the rotation shaft and, among the latter, devices including a retaining wedge that is easy to fit in that it is fitted easily by sliding the retaining wedge straddling the rotation shaft in a radial fitting direction relative to the shaft: the documents EP1050099, U.S. Pat. No. 7,898,132, JP5317751 and JP2013203184 are examples of this.

SUMMARY

In all of the above prior art the device for generating an axial force locks the axial play of the bearing guiding the rotation shaft situated in an intermediate position between the worm and the rotor of the electric motor.

The ball bearing is therefore retained in a bearing support including a seat fastened to the casing of the reduction gear mechanism, the seat including a face bearing on the edge surface of the outer race of the bearing, facing away from the position of the worm. The retaining wedge is an element mounted by sliding it in a radial direction relative to the shaft.

During assembly, the ball bearing is pre-positioned on the rotation shaft with the inner race of the ball bearing locked beforehand in position on the rotation shaft. The rotation shaft/ball bearing assembly is then threaded on from the outside through an opening in the seat so as to cause the ball screw to penetrate into the casing of the reduction gear mechanism and simultaneously to position the outer race of the bearing so as to bear on the bearing face of the seat. The axial play is eliminated after inserting the retaining wedge in its sliding direction, radially relative to the rotation shaft, by causing the retaining wedge to slide in the guides of the casing.

Once in the locking position, the retaining wedge exerts an axial force on the ball bearing, said force being directed toward the bearing support seat, the outer race of the bearing being locked by the retaining wedge toward the worm end and by the bearing face of the seat toward the opposite end to the worm relative to the position of the bearing: the axial force of the retaining wedge on the outer race of the ball bearing is therefore always directed toward the worm.

The inventor has observed that the presence of a device of the above kind for generating an axial force relying on locking the ball bearing disposed at an intermediate position between the worm and the electric motor can represent a penalty when the aim is to limit the overall size of the electric motor in the axial direction.

DESCRIPTION

Figure 1:
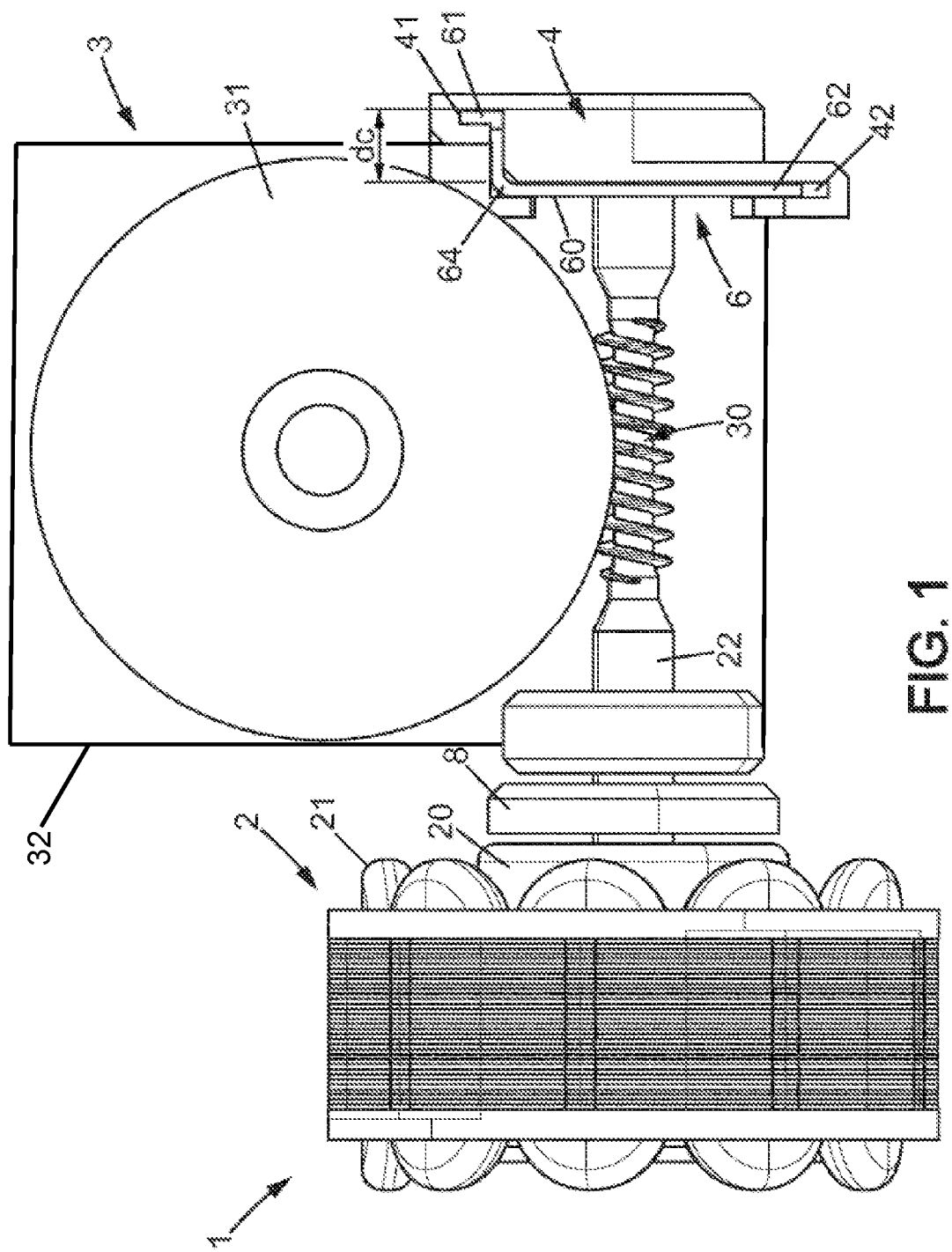
FIG. 1 illustrates a gear motor according to embodiments disclosed herein.

An object of the present invention is to alleviate the aforementioned disadvantages by proposing a gear motor for a motor vehicle wiper system in which the motor shaft is guided so as to make it possible to obtain good compactness along the longitudinal axis of the rotation shaft and without sacrificing the compensation of axial play of the rotation shaft.

Other objects and advantages of the invention will become apparent in the course of the following description given by way of nonlimiting illustration only.

Thus the invention firstly concerns:
an electric motor including:
  a rotor including magnetic elements,
  a stator including windings for electromagnetic excitation of the rotor,
  a rotation shaft fastened to the rotor,
a reduction gear mechanism connecting the rotation shaft and an output shaft of the gear motor,
a casing 32 forming a protective envelope for the reduction gear mechanism, and possibly even said electric motor, and in which said reduction gear mechanism includes a worm gear, the worm being fastened to the rotation shaft of the rotor and the worm wheel being fastened to the output shaft of the gear motor, a bearing support fastened to the casing 32 receiving a ball bearing configured to guide the rotation shaft, said ball bearing including an inner race mounted on the rotation shaft and an outer race, the bearing support including a seat to receive and support the outer race of the ball bearing that includes a bearing face for the outer face of the ball bearing, a device for generating an axial force configured to compensate axial play of the rotation shaft, including a retaining wedge mounted to slide in a radial direction relative to said rotation shaft, said retaining wedge exerting an axial force on the outer race of the ball bearing, said force being directed toward the bearing face of the seat of the bearing support.

According to the invention, said retaining wedge is disposed in an intermediate position between the seat of the bearing support and the worm in the immediate vicinity of the worm wheel, said axial force exerted by the retaining wedge on the outer race of the ball bearing being directed away from the worm.

Said ball bearing retained between the seat of the bearing support and the retaining wedge may advantageously be that guiding the end of the rotation shaft at the end opposite the electric motor relative to the worm, namely the end of the rotation shaft at the greatest distance from the electric motor.

The retaining wedge may be situated at a distance less than 3 mm from the teeth of the worm wheel, such as for example 2 mm.

In accordance with one embodiment, the retaining wedge may include:

a front wall with a notch through which the rotation shaft passes having an external face directed toward the worm and an internal face bearing on the outer race of the ball bearing, transmitting said axial force to the outer race of the ball bearing, two mounting flanges positioned on respective opposite sides of the notch intended to be slidably engaged respectively in two parallel mounting grooves of said bearing support.

In order to move the ball bearing toward the worm wheel, the gear motor may have the following features:

said mounting flange disposed on the worm wheel side relative to the notch, termed the first mounting flange, may be spaced from the worm wheel by a position offset in the axial direction of the rotation shaft and relative to the axial position of the front wall; in this case the front wall and said first mounting flange offset axially from the front wall may be connected by an elbow of the retaining wedge;

said elbow may include a notch at the height of and in the immediate vicinity of the teeth of the worm wheel.

In accordance with optional features of the invention, separately or in combination:

the other mounting flange disposed on the other side of the notch, termed the second mounting flange, is at a different axial position from the first mounting flange along the axis of the rotation shaft, axially closer to the worm wheel compared to the first assembly flange: for example the axial position of the second mounting flange along the axis of the rotation shaft is identical to the position of the front wall;

the notch in the front wall through which the rotation shaft passes opening toward the bottom of the retaining wedge, a cover projecting from the front wall at the height of the retaining wedge and in such a manner as to cover the ball bearing and/or said bearing support;

the bearing support includes a housing forming the seat for the outer race of the ball bearing, the housing including an opening for inserting the ball bearing facing the worm, a cylindrical internal wall cooperating with the cylindrical surface of the outer race of the ball bearing, and a back shoulder bearing on the edge surface of the outer race of the ball bearing situated opposite that on which the retaining wedge bears;

the body of the bearing support in which the housing is formed includes a front face in which the insertion opening is formed, the mounting groove engaging with said first mounting flange being in a position spaced axially from the front face, creating a lateral offset in the body;

the thickness ep of the thinnest zone of the wall of the body of the bearing support defined between the cylindrical internal wall of the housing and the exterior lateral face of the body on the side of the worm wheel is less than 5 mm, in particular less than 3 mm;

said rotation shaft is guided only by two ball bearings, including said ball bearing retained between the bearing support and the retaining wedge to guide the end of the rotation shaft situated at the end opposite the electric motor relative to the worm, as well as a second bearing for guiding the other end of the rotation shaft situated at the electric motor end.

According to the invention, the distance separating the ball bearing and the periphery of the worm wheel may be less than 10 mm, preferably less than 8 mm, and more preferably less than 6 mm, and even more preferably less than 4 mm.

Figure 2:
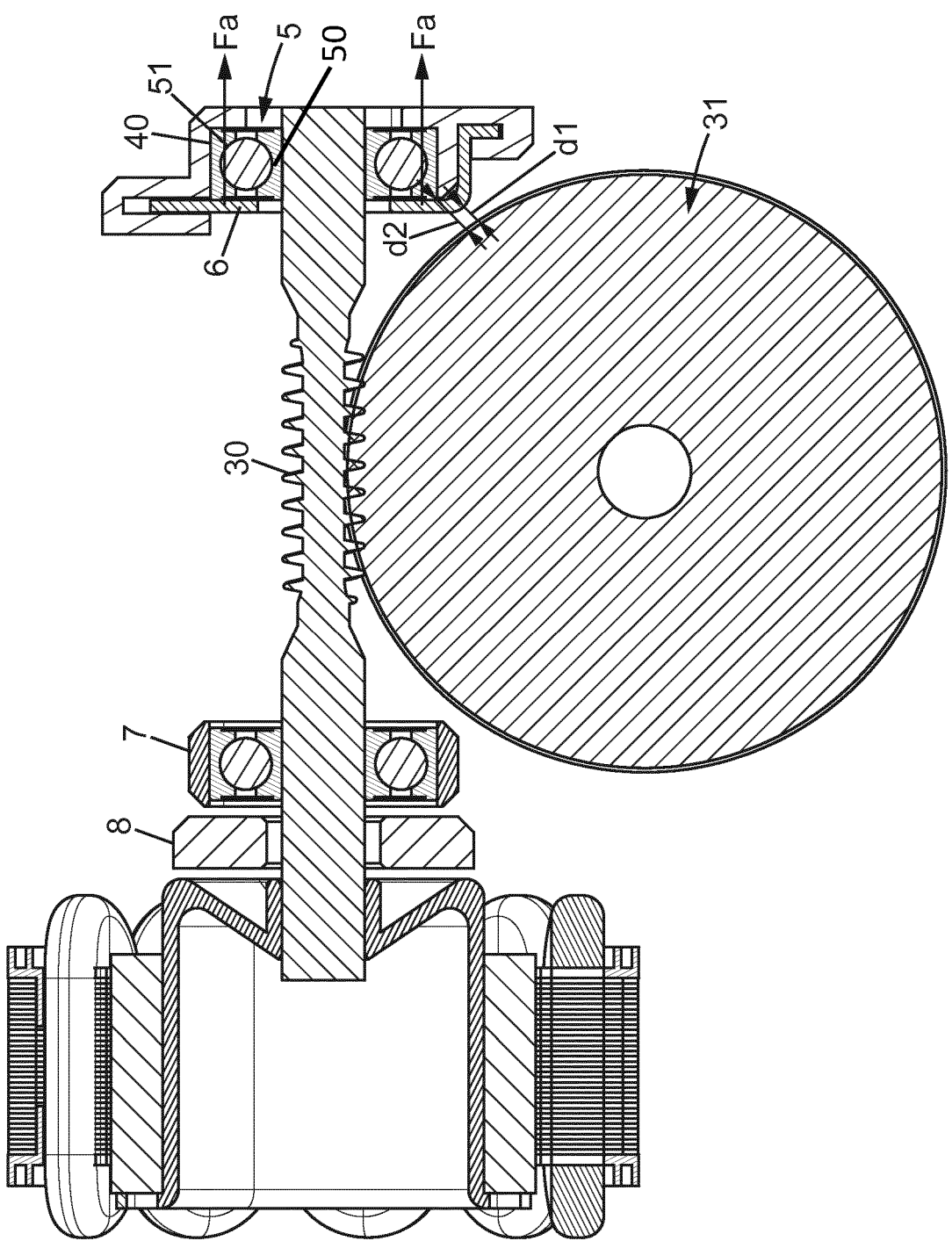
FIG. 2 illustrates a gear motor according to embodiments disclosed herein.
Figure 3:
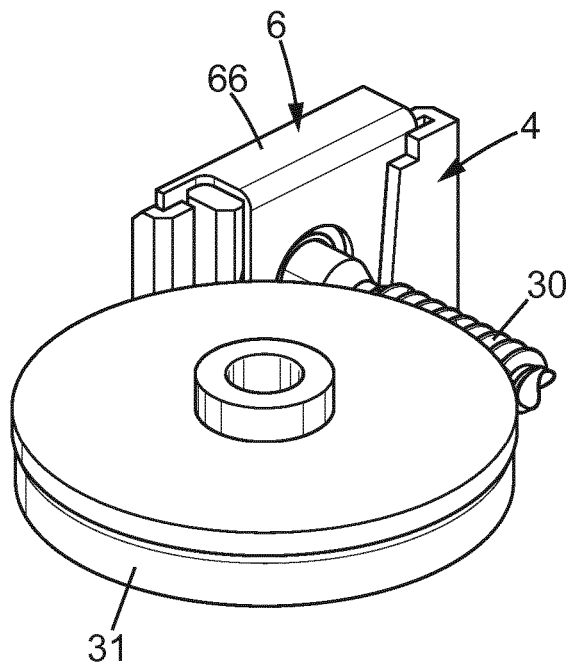
FIG. 3 illustrates a portion of a gear motor according to embodiments disclosed herein.
Figure 4:
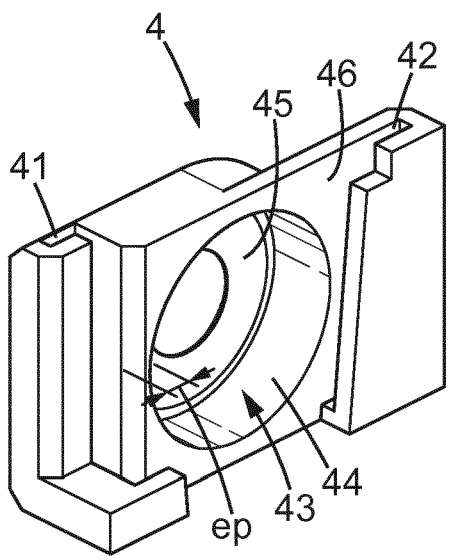
FIG. 4 illustrates a portion of a gear motor according to embodiments disclosed herein.
Figure 5:
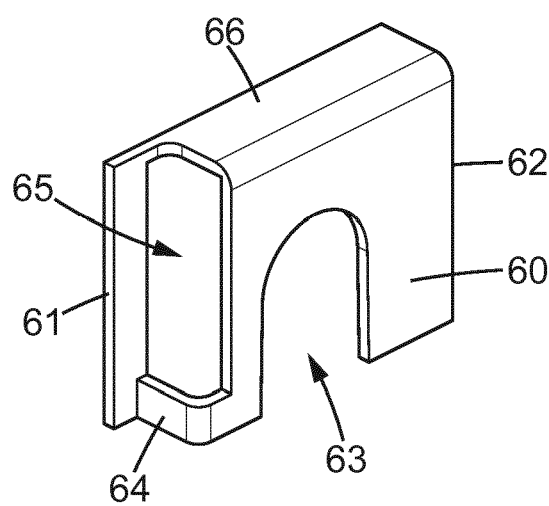
FIG. 5 illustrates a portion of a gear motor according to embodiments disclosed herein.

The invention will be better understood after reading the following description accompanied by the appended drawings, in which:

FIG. 1 is a partial view from above of a gear motor in accordance with one embodiment of the invention, showing more particularly the position of the retaining wedge in the immediate vicinity of the teeth of the worm wheel, FIG. 2 is a sectional view of FIG. 1 on a section plane parallel to the worm wheel and passing through the axis of the rotation shaft, more particularly showing the direction of the axial force applied by the retaining wedge to the outer race of the ball bearing that is directed away from the worm, the distance d1 separating the retaining wedge and the periphery of the worm wheel and the distance d2 that the invention aims to minimize, namely the distance separating the ball bearing and the periphery of the worm wheel, FIG. 3 is a (partial) perspective view of a gear motor in accordance with the invention that is distinguished in particular from that from FIG. 1 in that the retaining wedge advantageously has a notch at the level of an elbow between the front wall of the wedge and a mounting flange, on the worm wheel side, so as to be able to position the ball bearing even closer to the worm wheel compared to the embodiment from FIG. 1, FIGS. 4 and 5 are detail views of the retaining wedge and the bearing support of the gear motor from FIG. 3.

Thus the invention relates to a gear motor 1 for a motor vehicle wiper system, including:

an electric motor 2 including:

a rotor 20 including magnetic elements, a stator 21 including windings for electromagnetic excitation of the rotor, a rotation shaft 22 fastened to the rotor, a reduction gear mechanism 3 connecting the rotation shaft 22 and an output shaft of the gear motor, a casing 32 forming a protective envelope for the reduction gear mechanism 3, and possibly even said electric motor 2.

The electric motor 2 may be of the dc type with brushes or alternately of the dc type without brushes. In the latter case (namely a brushless motor), a gear motor of this kind includes a device for determining the angular position of the rotor 20 relative to the stator 21. A controller (not shown) is configured to generate control signals for supplying power to the electromagnetic excitation windings of the stator 21 as a function of the angular position of the rotor determined by the device for determining the angular position of the rotor.

In accordance with one embodiment, the device for determining the angular position of the rotor may include a multipole magnet constrained to rotate with the rotor and one or more Hall-effect sensors (not shown) at fixed positions adapted to detect changes of the magnetic domains of the multipole magnet when the rotor rotates.

The reduction gear mechanism 3 includes a worm/worm wheel system, the worm 30 being fastened to the rotation shaft of the rotor 22 and the worm wheel 31 being fastened to the output shaft of the gear motor. The worm may consist of a screwthread in one piece with the material of the shaft.

The gear motor includes a bearing support 4 fastened to the casing 32 and receiving a ball bearing 5 configured to guide the rotation shaft 22. The bearing support 4 is in particular in one piece with the envelope forming the casing 32 of the gear motor.

The ball bearing 5 includes an inner race 50 mounted on the rotation shaft 22 and an outer race 51. The inner race 50 and the outer race 51 form between them an annular housing for the balls of the bearing, the inner and outer races having respective rolling tracks for the balls. The inner race is locked in both axial directions to the rotation shaft 22 by any means known to the person skilled in the art such as for example by shrinking or an elastic ring (Circlip® or other type).

The bearing support 4 including a seat 40 to receive and support the outer race 51 of the ball bearing 5 that includes a bearing face for the outer race 51 of the ball bearing.

In accordance with the invention, the gear motor 1 includes a device for generating an axial force configured to compensate axial play of the rotation shaft 22 and that includes a retaining wedge 6. That retaining wedge is slidably mounted in a radial direction relative to said rotation shaft 22 to enable it to be withdrawn or conversely to be placed in the fixed guides of the casing 32. In its mounted position the retaining wedge 6 exerts an axial force on the outer race 51 of the ball bearing 5, said axial force being directed toward the bearing face of the seat 40 of the bearing support 4. This produces the locking of the outer race 51 of the ball bearing in both axial directions, said outer race being engaged between the retaining wedge 6 and the bearing face of the seat 40 of the bearing support 4 on either side of the ball bearing 5.

According to one feature of the invention said retaining wedge 6 is disposed in an intermediate position between the seat 40 of the bearing support 4 and the worm 30 in the immediate vicinity of the worm wheel 31.

As shown in the example from FIG. 2, said axial force Fa exerted by the retaining wedge 6 on the outer race 51 of the ball bearing 5 is therefore directed away from the worm 30 (and not toward the worm as in the aforementioned prior art, consisting in particular of the document EP1050099).

The retaining wedge 6 may be situated at a distance d1 from the teeth of the worm wheel 31 less than or equal to 5 mm, preferably less than 3 mm, such as for example less than or equal to 2 mm.

The retaining wedge 6 cooperates with said bearing support 4 to retain the ball bearing 5 guiding the end of the rotation shaft 22 and advantageously situated at the opposite end to the electric motor 2 relative to the worm 30, namely the end of the rotation shaft 22 at the greatest distance from the electric motor 2.

In accordance with an advantageous embodiment enabling limitation of the length of the rotation shaft, said rotation shaft 22 is guided only by two ball bearings 5, 7 including said ball bearing 5 retained between the bearing support 4 and the retaining wedge 6 to guide the end of the rotation shaft 22 situated at the end opposite the electric motor relative to the worm 30 and a second bearing 7 to guide the other end of the rotation shaft 22 situated at the electric motor 2 end relative to the worm 30.

The retaining wedge 6 may include a front wall 60 with a notch 63 through which the rotation shaft 22 passes (with the wedge in the mounted position). This front wall 60 has an external face directed toward the worm 30 and an internal face bearing on the outer race 51 of the ball bearing 5. The internal face bears on the outer race 51 of the ball bearing and transmits said axial force Fa to the outer race 51 of the ball bearing 5.

The retaining wedge 6 may further include two mounting flanges 61, 62 positioned on respective opposite sides of the notch 63 and intended to be slidably engaged in respective fixed guides such as two mounting grooves 41, 42 parallel to said bearing support 4.

In accordance with one embodiment, said mounting flange 61 disposed at the worm wheel 31 end relative to the notch 63, termed the first mounting flange, may advantageously be away from the worm wheel 31 thanks to a position offset (dc in FIG. 1) in the axial direction of the rotation shaft 22 and relative to the axial position of the front wall 60. This offset position of the mounting flange 61 advantageously makes it possible to move the ball bearing 5 as close as possible to the worm wheel 31 and thus to reduce the length of the rotation shaft 22 by comparison with a solution (not shown) with the mounting flange disposed in the plane of the front wall 60 of the retaining wedge 6.

Note therefore that the front wall 60 and said first mounting flange 61 offset axially from the front wall 60 may be connected by an elbow 64 of the retaining wedge 6. Note further that, as shown by way of illustration in FIGS. 3 and 4, said elbow 64 may include a notch 65 at the height of and in the immediate vicinity of the teeth of the worm wheel 31 with the aim of moving the ball bearing 5 even closer to the worm wheel 31.

The other mounting flange disposed on the other side of the notch 63 relative to the first mounting flange is termed the second mounting flange 62: this second mounting flange 62 may be at a different axial position to the first mounting flange 61 along the axis of the rotation shaft, and in particular at a position axially close to the worm wheel 31 (compared to the first mounting flange 61) in that it does not necessarily constitute an obstacle to moving closer to the ball bearing 5. For example, the axial position of the second mounting flange 62 along the axis of the rotation shaft 22 is identical to the position of the front wall 60, said second mounting flange 62 then being situated in line with the front wall 60.

The notch 63 in the front wall 60 through which the rotation shaft 22 passes opens toward the bottom of the retaining wedge and a cover 66 may project from the front wall 60 at the top of the retaining wedge 6. Once in the mounted position, this cover 66 of the retaining wedge 6 comes to cover the ball bearing 5 and/or said bearing support 4.

The bearing support 4 may include a housing forming the seat 40 for the outer race 51 of the ball bearing 5. The housing has an opening 43 for inserting the ball bearing facing toward the worm 30, a cylindrical internal wall 44 cooperating with the cylindrical surface of the outer race 51 of the ball bearing 5, and a back shoulder 45. The back shoulder 45 forms the face (i.e. the bearing face) of the seat that bears on the edge surface of the outer race 51 of the ball bearing 5 situated opposite that on which the retaining wedge 6 bears.

The body of the bearing support 4 in which the housing is formed includes a front face 46 directed toward the worm and in which is formed the insertion opening 43 enabling fitting of the ball bearing 5. The mounting groove 41 of the support engaging with said first mounting flange 61 may be away from the worm wheel, namely at a position spaced axially from the front face 46. This spacing creates a lateral offset the body enabling the body of the bearing support 4 to be moved as close as possible to the worm wheel 31. To this end, the thickness ep of the thinnest zone of the wall of the body of the bearing support 4 defined between the cylindrical internal wall 44 of the housing and the exterior lateral face of the body (at the worm wheel 31 end) may be smaller, less than 5 mm, in particular less than or equal to 3 mm. The distance d2 separating the ball bearing 5 and the periphery of the worm wheel 31 may advantageously be shorter, for example less than 10 mm, in particular less than 8 mm, and more preferably less than 6 mm, or even less than 4 mm.

PARTS LIST

1 Gear motor
2 Electric motor
20 Rotor
21 Stator
22 Rotation shaft
3 Reduction gear mechanism
30 Worm
31 Worm wheel
32 Casing
4 Bearing support
40 Seat
41, 42 Mounting grooves
43 Ball bearing insertion opening
44 Cylindrical internal wall
45 Back shoulder
46 Front face
5 Ball bearing (first bearing)
50, 51 Inner race and outer race, respectively
5 6 Retaining wedge
60 Front wall
61, 62 Mounting flanges
63 Notch in front wall through which rotation shaft passes
64 Elbow
65 Notch (elbow)
66 Cover
7 Second bearing
8 Multipole magnet
d1 Distance between worm wheel and retaining wedge
d2 Distance separating worm wheel and ball bearing
ep Thickness of thinnest zone of wall of body of bearing support defined between internal wall of housing and exterior lateral face of body at worm wheel end
Fa Axial force exerted by retaining wedge on ball bearing

The invention claimed is:

1. A gear motor for a motor vehicle wiper system, comprising:
    an electric motor including:
        a rotor including magnetic elements,
        a stator including windings for electromagnetic excitation of the rotor,
        a rotation shaft fastened to the rotor,
        a reduction gear mechanism connecting the rotation shaft and an output shaft of the gear motor,
        a casing forming a protective envelope for the reduction gear mechanism,
        wherein the reduction gear mechanism includes a worm gear, the worm gear is comprised of a worm being fastened to the rotation shaft of the rotor and a worm wheel being fastened to the output shaft of the gear motor;
        a bearing support fastened to the casing receiving a ball bearing configured to guide the rotation shaft, said ball bearing including an inner race mounted on the rotation shaft and an outer race, the bearing support including a seat to receive and support the outer race of the ball bearing that includes a back shoulder for an outer face of the ball bearing, and
        a retaining wedge configured to compensate an axial play of the rotation shaft, the retaining wedge being mounted to slide in a radial direction relative to said rotation shaft, said retaining wedge exerting an axial force on the outer race of the ball bearing, said axial force being directed toward the back shoulder of the seat of the bearing support,
    wherein said retaining wedge is disposed in an intermediate position between the seat of the bearing support and the worm in the vicinity of the worm wheel, said axial force exerted by the retaining wedge on the outer race of the ball bearing being directed away from the worm;
    wherein a distance separating the ball bearing and the periphery of the worm wheel is less than 10 mm.

2. The gear motor according to claim 1, in which the retaining wedge is situated at a distance less than 3 mm from the teeth of the worm wheel.

3. The gear motor as claimed in claim 1, in which the retaining wedge includes:
    a front wall with a notch through which the rotation shaft passes having an external face directed toward the worm and an internal face bearing on the outer race of the ball bearing, transmitting said axial force to the outer race of the ball bearing,
    two mounting flanges positioned on respective opposite sides of the notch, the two mounting flanges being slidably engaged respectively in two parallel mounting grooves of said bearing support.

4. The gear motor as claimed in claim 3, in which the notch of the front wall through which the rotation shaft passes opens toward the bottom of the retaining wedge, and a cover projecting from the front wall at the top of the retaining wedge covers the ball bearing and/or said bearing support.

5. The gear motor as claimed in claim 3, in which a first mounting flange of the two mounting flanges is disposed on a worm wheel side relative to the notch is spaced from the worm wheel by a position offset in the axial direction of the rotation shaft and relative to the axial position of the front wall.

6. The gear motor as claimed in claim 5, in which the bearing support includes a housing forming the seat for the outer race of the ball bearing, the housing including a ball bearing insertion opening facing toward the worm, and the back shoulder bearing on an edge surface of the outer race of the ball bearing situated opposite that on which the retaining wedge bears.

7. The gear motor as claimed in claim 6, in which the body of the bearing support in which the housing is formed includes a front face in which the insertion opening is formed, the mounting groove engaging with said first mounting flange being in an axially offset position relative to the front face, creating a lateral offset in the body.

8. The gear motor as claimed in claim 7, in which the thickness of the thinnest zone of the wall of the body of the bearing support is less than 3 mm.

9. The gear motor as claimed in claim 5, in which the front wall and said first mounting flange offset axially from the front wall are connected by an elbow of the retaining wedge.

10. The gear motor as claimed in claim 9, in which said elbow includes a second notch at the height of and in the vicinity of the teeth of the worm wheel.

11. The gear motor as claimed in claim 5, in which said first mounting flange disposed on the worm wheel side of the notch of the front wall being spaced from the worm wheel by said position offset in the axial direction of the rotation shaft and in which the other mounting flange disposed on the other side of the notch, termed the second mounting flange, is at a different axial position than the first mounting flange along the axis of the rotation shaft, in a position axially closer to the worm wheel compared to the first mounting flange.

12. The gear motor as claimed in claim 11, in which the axial position of the second mounting flange along the axis of the rotation shaft is identical to the position of the front wall.

13. The gear motor as claimed in claim 1, in which said ball bearing retained between the seat of the bearing support and the retaining wedge guides the end of the rotation shaft at the end opposite the electric motor relative to the worm.

14. The gear motor as claimed in claim 1, in which said rotation shaft is guided only by two ball bearings, including said ball bearing retained between the bearing support and the retaining wedge to guide the end of the rotation shaft situated at the opposite end to the electric motor relative to the worm and a second bearing for guiding the other end of the rotation shaft situated at the electric motor end.

* * * * *